US010677761B2

(12) United States Patent
Forster (10) Patent No.: US 10,677,761 B2
(45) Date of Patent: Jun. 9, 2020

(54) SYSTEMS AND METHODS FOR MONITORING BLISTER PACK COMPLIANCE (71) Applicant: Avery Dennison Retail Information Services, LLC, Westborough, MA (US)

(72) Inventor: Ian J. Forster, Chelmsford (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 43 days.

(21) Appl. No.: 15/366,764

(22) Filed: Dec. 1, 2016

(65) Prior Publication Data
US 2018/0156756 A1 Jun. 7, 2018

(51) Int. Cl.
*G01N 29/07* (2006.01)
*G01N 29/12* (2006.01)
(Continued)

(52) U.S. Cl.
CPC .............. *G01N 29/07* (2013.01); *A61J 1/035* (2013.01); *G01N 29/043* (2013.01); *G01N 29/12* (2013.01);
(Continued)

(58) Field of Classification Search
CPC ...... G01N 29/07; G01N 29/46; G01N 29/348; G01N 29/343; G01N 29/223; G01N 29/12;
(Continued)

(56) References Cited

U.S. PATENT DOCUMENTS 4,395,913 A * 8/1983 Peterson .................. B06B 1/04
310/313 A
5,195,046 A * 3/1993 Gerardi .................. B64D 15/16
702/35
(Continued)

FOREIGN PATENT DOCUMENTS

DE 102006023594 11/2007
EP 1501463 8/2011
(Continued)

OTHER PUBLICATIONS

International Search Report and Written Opinion of ISA/EPO dated May 7, 2018 prepared for PCT/US2017/063837.
(Continued)

*Primary Examiner* — Xin Y Zhong
(74) *Attorney, Agent, or Firm* — Avery Dennison Retail Information Services, LLC (57) ABSTRACT

Disclosed herein is a system for determining discontinuities in a blister pack. The system includes a blister pack and a discontinuity sensing apparatus coupled to the blister pack. The blister pack includes a tray with a plurality of cells and a seal layer arranged to seal the cells. The discontinuity sensing apparatus includes a signal generation element and a signal receiving element. In one embodiment, the signal generation element is arranged to transmit an acoustic pulse. In another embodiment, the signal generation element is arranged to transmit a swept acoustic signal. In one embodiment, the discontinuity sensing apparatus is coupled to the blister pack such that each of the plurality of cells is positioned at a unique distance from the discontinuity sensing apparatus. The determinations on discontinuities can be made in part from information from the time domain and/or in part from information from the frequency domain.

17 Claims, 8 Drawing Sheets

(51) Int. Cl.
*G01N 29/04* (2006.01)
*G01N 29/22* (2006.01)
*A61J 1/03* (2006.01)
*G01N 29/34* (2006.01)
*G01N 29/46* (2006.01)

(52) U.S. Cl.
CPC ......... *G01N 29/223* (2013.01); *G01N 29/343* (2013.01); *G01N 29/348* (2013.01); *G01N 29/46* (2013.01); *A61J 2200/70* (2013.01); *G01N 2291/011* (2013.01); *G01N 2291/015* (2013.01); *G01N 2291/102* (2013.01); *G01N 2291/2695* (2013.01); *G01N 2291/2698* (2013.01)

(58) Field of Classification Search
CPC .......... G01N 29/043; G01N 2291/102; G01N 2291/015; G01N 2291/2698; G01N 2291/2695; G01N 2291/011; A61J 1/035; A61J 2200/70; B65B 9/04
See application file for complete search history.

(56) References Cited

U.S. PATENT DOCUMENTS

| | | | |
|---|---|---|---|
| 6,294,912 B1* | 9/2001 | Kwun | G01N 29/11 324/240 |
| 6,880,379 B2 | 4/2005 | Hedberg et al. | |
| 7,687,039 B2 | 3/2010 | Laugharn et al. | |
| 8,674,825 B2 | 3/2014 | Zdebiick et al. | |
| 9,233,051 B2 | 1/2016 | Tufi | |
| 2005/0115324 A1* | 6/2005 | Stauffer | G01L 3/24 73/617 |
| 2007/0240712 A1 | 10/2007 | Fleming et al. | |
| 2007/0296963 A1* | 12/2007 | Parker | G01N 21/55 356/240.1 |
| 2014/0262919 A1 | 9/2014 | Hussain et al. | |
| 2017/0172851 A1* | 6/2017 | Schmid | A61J 7/02 |

FOREIGN PATENT DOCUMENTS

| | | |
|---|---|---|
| WO | 2006002667 | 1/2006 |
| WO | 2007043858 | 4/2007 |
| WO | 2016094608 | 6/2016 |

OTHER PUBLICATIONS

Hertlin et al., Acoustic Resonance Testing: the upcoming volume-oriented NDT method, Jun. 2, 2003, http://www.aaende.org/ar/ingles/sitio/biblioteca/material/t-061.pdf.

* cited by examiner

SYSTEMS AND METHODS FOR MONITORING BLISTER PACK COMPLIANCE

FIELD OF INVENTION

The present disclosure generally relates to systems and methods for determining the presence of a discontinuity in an otherwise continuous surface. More specifically, the present disclosure relates to systems and methods that implement acoustic pulse, swept frequency, and acousto-magnetic techniques to determine the presence of discontinuity in the sealed surface of blister packs.

BACKGROUND

Blister packs have become common place in the retail sale of consumer goods such as over-the-counter and prescription pharmaceuticals, gum, mints, and other small consumer goods and products. In essence, a blister pack is a two-part container. The first part is a plastic tray that includes several cavities or pockets (herein inclusively referred to as "cells") into which items can be placed. The second part is a flat seal layer of aluminum foil, plastic, paperboard, or the like that is secured to the tray so as to seal the cells. Items are removed from the cells by breaking the section of the seal layer above the cell. Such sealing not only retains the items in the cavities or pockets, but can also protect the items for contamination, spoiling, tampering, and the like. If there is a hole, tear, or other defect or other discontinuity in the seal layer, the items in the cells can be exposed to the surrounding environment. It will be understood that such exposure can be detrimental to the product, particularly when the product is a pharmaceutical or food product. Systems and methods are desired that can determine the integrity of the seal layer, particularly where the portion of the seal layer is above cells in the blister pack.

Another aspect of the need to monitor if a cell had been opened and the product removed is in compliance monitoring. The activity allow a healthcare professional or other care giver to determine remotely if a medication regime is being followed, for example the correct drugs being taken at the correct time, by patients such as the elderly, as this can be very important in their treatment.

Methods of determining the presence of a discontinuity in a medium are known. One example is SONAR, where a discontinuity is the presence of a vessel or other large object below the surface of a body of water. When a sound wave moves through the water, it will reflect off a vessel back in the direction of origin and can be detected. When the reflective wave is detected, it can be analyzed and concussions can be drawn about the location and other characteristics of the vessel. Another example is non-destructive testing, where features such as cracks or other defects are considered the discontinuities. For a blister pack, the mechanical structure of the pack is modified when the seal layer above a cell is opened, which is considered an discontinuity. Such discontinuity is appropriate when it is intended, for example, when an item is intentionally removed from its cell. However, during shipping or storage, such discontinuities are unwanted and can harm the items in the exposed cells. Determining a discontinuity in the blister pack can result in the appropriate removal of the blister pack form commerce because the blister pack may be non-compliant with safety and other standards.

There are current methods and systems available for determining when a cell in the blister pack has its seal broken. However, such current methods and systems require manual inspection or the use of specialized sealing film to determine when there is a discontinuity in a blister pack. There is a need for improvement to existing methods and systems that provide for the determination of blister pack compliance.

SUMMARY

Disclosed herein are systems for determining discontinuities in a blister pack. One exemplary system includes a blister pack and a discontinuity sensing apparatus coupled to the blister pack. The blister pack includes a tray with a plurality of cells and a seal layer arranged to seal the cells. The discontinuity sensing apparatus includes a signal generation element and a signal receiving element. In one embodiment, the signal generation element is arranged to transmit an acoustic pulse. In another embodiment, the signal generation element is arranged to transmit a swept acoustic signal. In one embodiment, the discontinuity sensing apparatus is coupled to the blister pack such that each of the plurality of cells is positioned at a unique distance from the discontinuity sensing apparatus. The determinations on discontinuities can be made in part from information from the time domain and/or in part from information from the frequency domain.

Also disclosed herein are methods for determining discontinuities in a blister pack. One exemplary method includes the step of providing a housing, a magnetic pulse driver disposed within the hosing, and a detector disposed within the housing. The method further includes the steps of placing a blister pack onto of the housing; directing a magnetic pulse from the magnetic pulse driver to the blister pack; and gathering information regarding discontinuities on a seal layer of the blister pack. The method can further includes the step of providing at least one magnetic material coupled to the blister pack. The method can further includes the step of determining the location of discontinuities based on the gather information.

BRIEF DESCRIPTION OF THE DRAWINGS

In the accompanying drawings, structures are illustrated that, together with the detailed description provided below, describe example embodiments of the disclosed methods. Where appropriate, like elements are identified with the same or similar reference numerals. Elements shown as single component can be replaced with multiple components. Elements shown as multiple components can be replaced with a single component. The drawings may not be to scale. The proportion of certain elements may be exaggerated for the purpose of illustration.

DETAILED DESCRIPTION

The methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques arrangements, method, etc. are either related to a specific example presented or are merely a general description of such a technique, arrangement, method, etc. identifications of specific details or examples are not intended to be and should not be construed as mandatory or limiting unless specifically designated as such. Selected examples of apparatus, arrangement, and methods for determining discontinuity in a blister pack are hereinafter disclosed and described in detail with reference made to FIGS. 1-8.

As will be described in detail, embodiments disclosed herein provide for novel systems and methods for determining the presence of discontinuity in a blister pack. The components of an exemplary systems and methods will be first described in detailed, followed by detailed description of how such components interact to provide the system and methods with data and information required to determine the presence of discontinuity in a blister pack and the location of the discontinuity.

Figure 1:
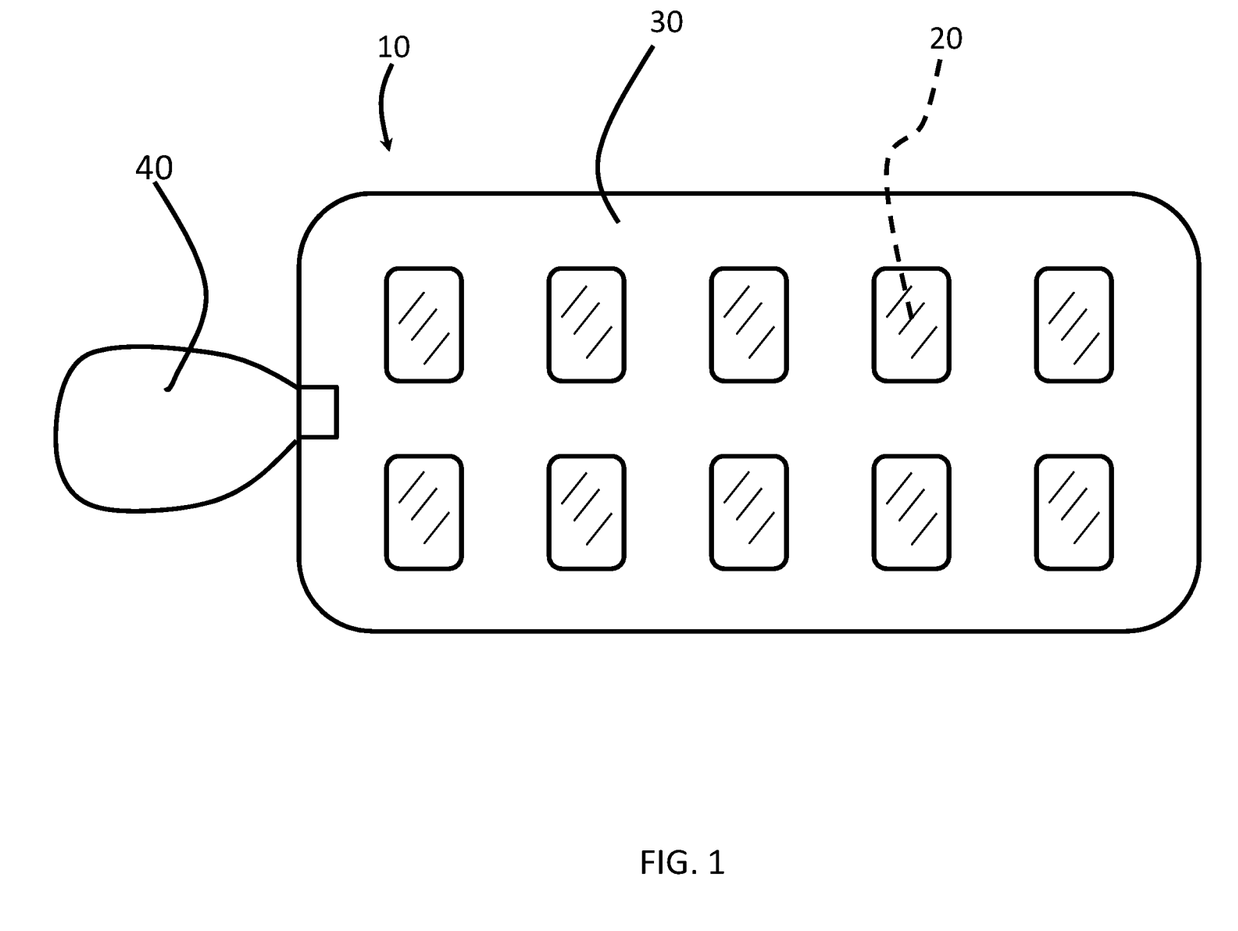
FIG. 1 schematically illustrates an assembly arranged to perform a pulse injection method for inspecting a blister pack.

FIG. 1 illustrates an exemplary embodiment of a blister pack 10. The blister pack 10 includes a total of ten cells 20, and a flat layer of foil sheet 30 secured in such a manner to seal the cells 20. As previously discussed, the cells 20 are designed to receive pharmaceuticals, food products, and the like. A discontinuity sensing apparatus 40 (hereafter to be referred to as a clip) is removeably secured to one edge of the blister pack 10. The clip 40 is arranged to launch an acoustic pulse across the foil sheet 30, and to receive any reflections of the acoustic pulse in the time domain. In addition to acoustic pulse generation, a frequency domain expanded equivalent can also be used. Because acoustics are used in this embedment, it is preferably for the blister pack 10 to be placed on a compliant surface, such as a foam during testing as that will reduce the number of false echoes associated with the surface. The clip 40 includes a launching element, capable of creating a rapid movement relative to the blister pack 10 that causes an acoustic pulse to propagate across the foil sheet 30. The clip 40 also includes a receiving element that will receive any reflections of the acoustic pulse due to discontinuities in the foil sheet 30. The clip 40 is arranged to convert the reflected and received acoustic pulse into an electrical signal, which can be analyzed by software, algorithms, and the like running on computing equipment (not shown).

The position of the clip 40, and thus, the pulse injection point, is selected such that the vector distance between the clip 40 and each cell 20 of the blister pack 10 is different. When the vector distance between the clip 40 and each cell 20 is different, information gathered in the time domain can be used to determine from which cell generated the information. In a simple example, the first reflective signal received by the clip 40 after the transmission of the acoustic pulse will represent the discontinuity that is closest to the clip 40. Because the geometry of the blister pack 10 is known and the characteristic such a speed of the acoustic pulse are known, each reflected signal can be correlated with a position on the blister pack 10.

Preferably, the system takes a time/response profile of the blister pack 10 before the contents of the cells are ejected. Gathering such information about the blister pack 10 structure can allow for the removal of noise reflection such as the bumps on the seal of the cells and reflections from the edge of the blister pack 10. For known blister pack structures, this step may not be required.

The clip 40 transmits an acoustic pulse across the foil sheet 30 of the blister pack 10. If the pulse does not encounter any changes in the mechanical structure or acoustic properties of the blister pack 10 (i.e., discontinuities), the pulse continues to propagate until it reaches the edge of the blister pack 10. The clip 40 will receive a number of responses in the time domain associated with the edge of the pack, but these will be known reflection and can be cancelled out as background noise.

If the pulse encounters discontinuity such as a change in the mechanical structure or acoustic property of the foil layer 30 above any cell 20, for example, it the foil layer 30 is open, reflected waves are created, which propagate back to the clip 40 and are received. These reflections are digitized in the clip 40 and can be analyzed in the time domain to determine where the discontinuity is located. Such a determination can indicates that the blister pack 10 is not complaint because the content of the cell 20 is not sealed. Thus the blister pack 10 can be properly handled.

Figure 2:
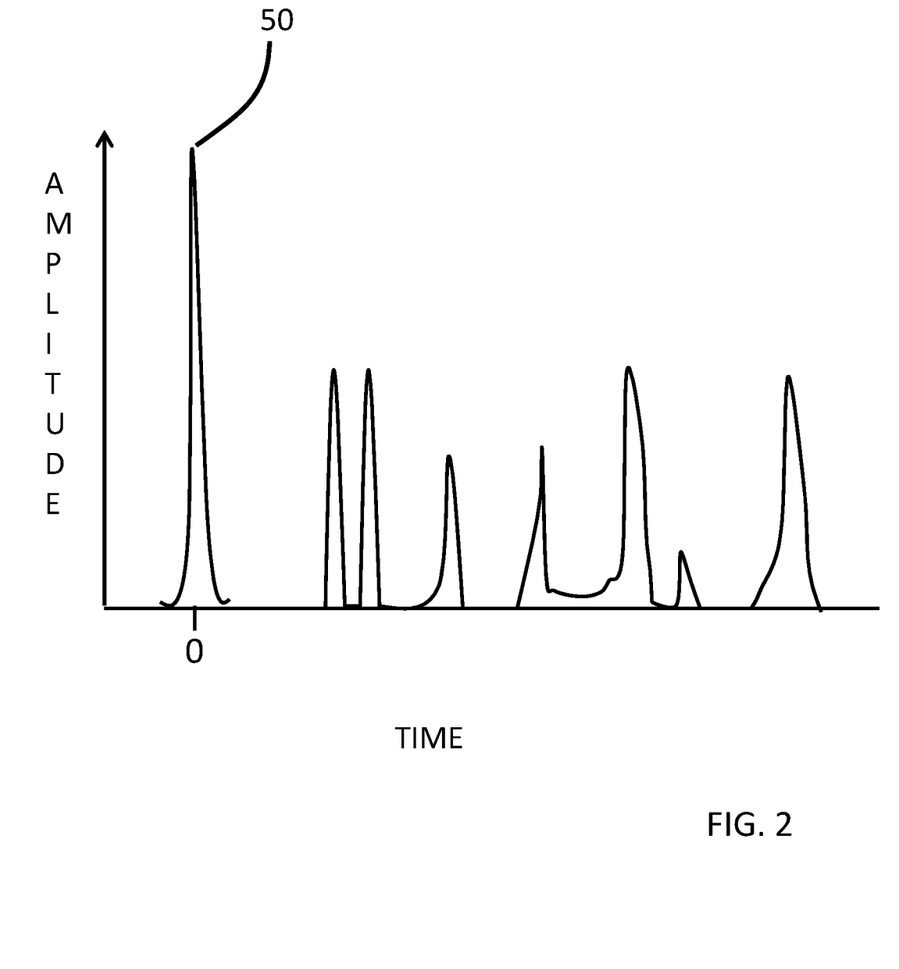
FIG. 2 illustrates a graph of reflected signals in time domain representing discontinuities in a blister pack.

FIG. 2 illustrates a graph of amplitude versus time for an acoustic pulse applied to a blister pack. The graph illustrates the initial pulse 50 as transmitted at time zero. When the initial pulse 40 encounters discontinuity in the blister pack, a reflection is sent back to the clip 40 and received by the clip 40. The peaks to the right of the initial pulse 50 represent reflections of the pulse due to discontinuities. By investigating the time it took from initial pulse to receiving the reflected signal, the location of the discontinuity on the blister pack can be determined. Under certain conditions, the amplitude of a reflected signal can also be used to ascertain characteristics of the discontinuity.

It will be understood that when the pulse is initiated, the pulse moves along the foil layer 30 until it encounters a first discontinuity, which causes a portion of the pulsed to be reflected back toward the clip 40. The pulse continues to propagate past the first discontinuity and encounter the next discontinuity, and so on until the pulse reaches the edge of the blister pack 10. The edge of the blister pack 10 can be arranged to reflect the pulse back to clip 40, which can be used to determined when the entire surface of the blister pack 10 has been inspected. The information represented by the graph of FIG. 2 can serve as an indicate that the reflections from the edges of the blister pack 10 has been received.

Figure 3:
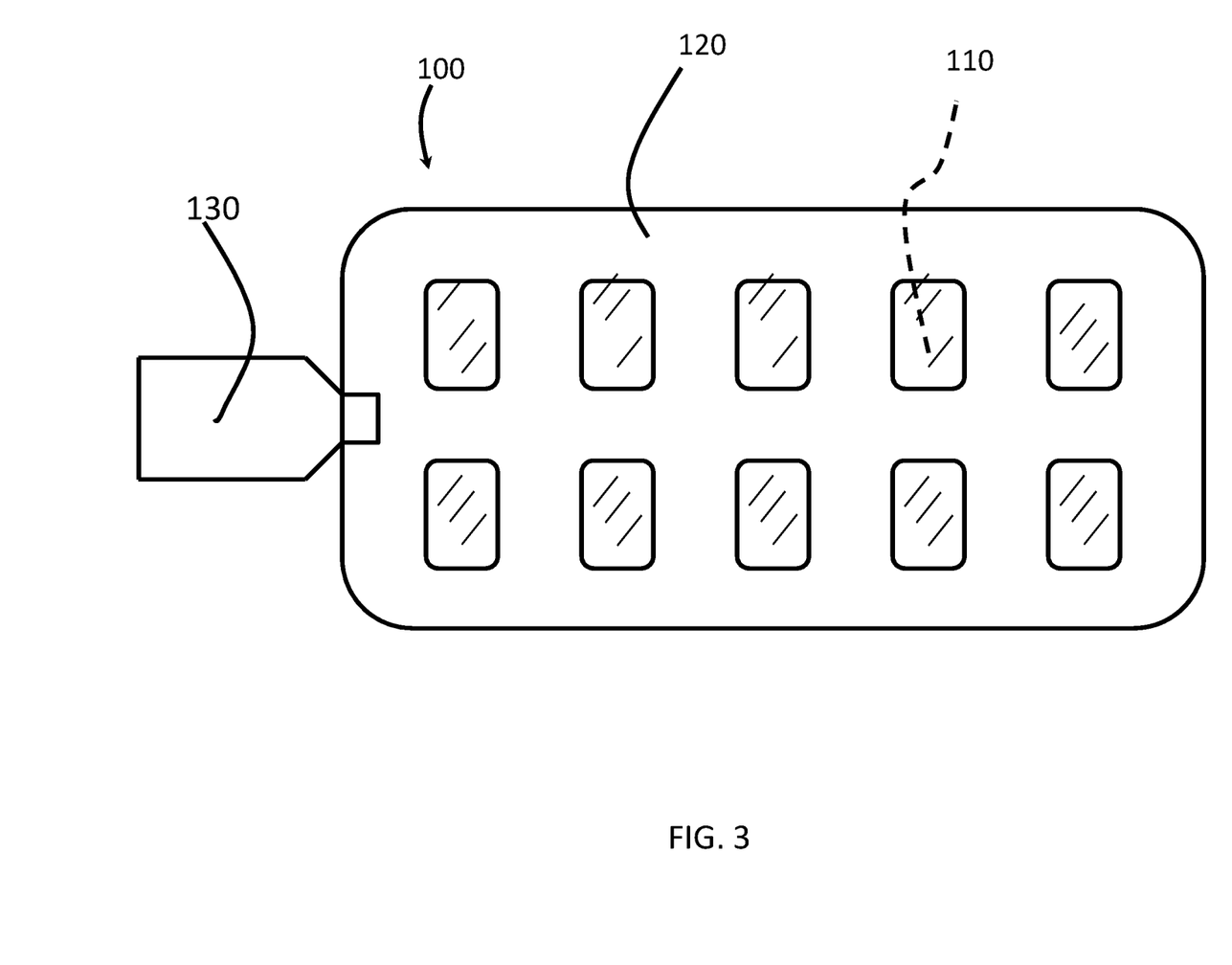
FIG. 3 schematically illustrates an assembly arranged to perform a swept frequency method for inspecting a blister pack.
Figure 4:
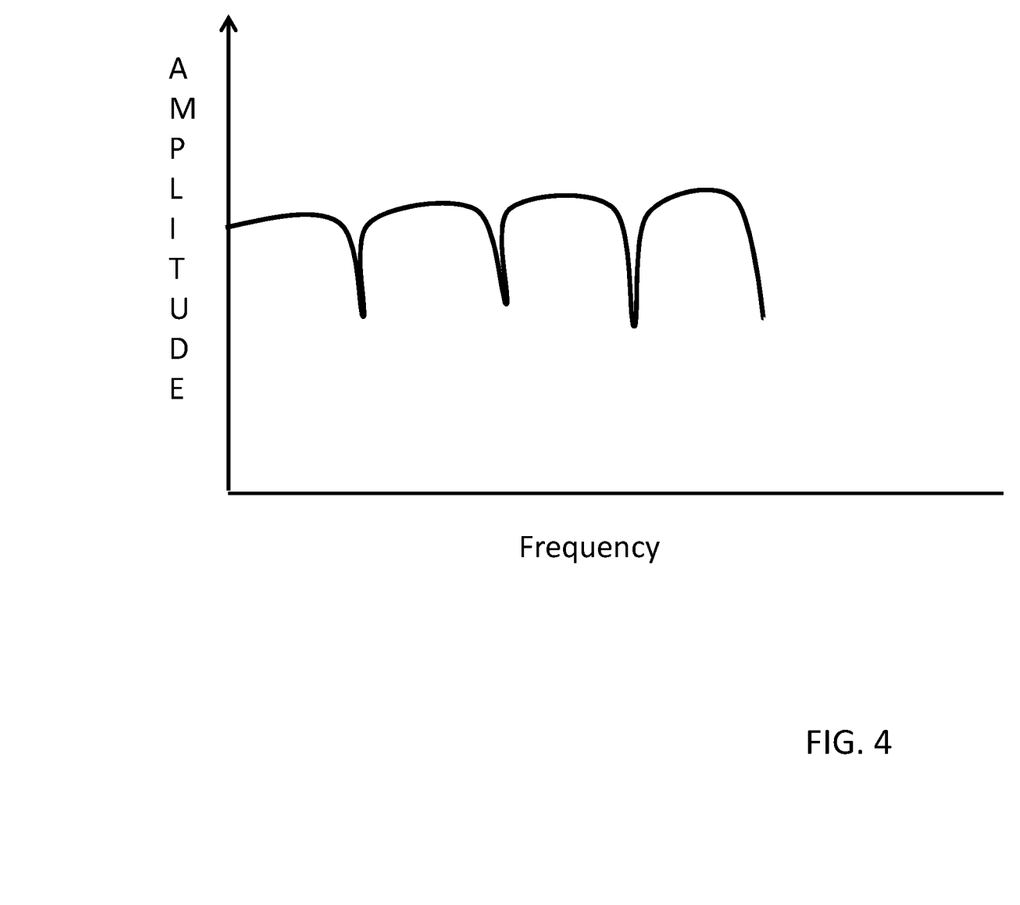
FIG. 4 illustrates a graph representing frequencies were energy is adsorbed.
Figure 5:
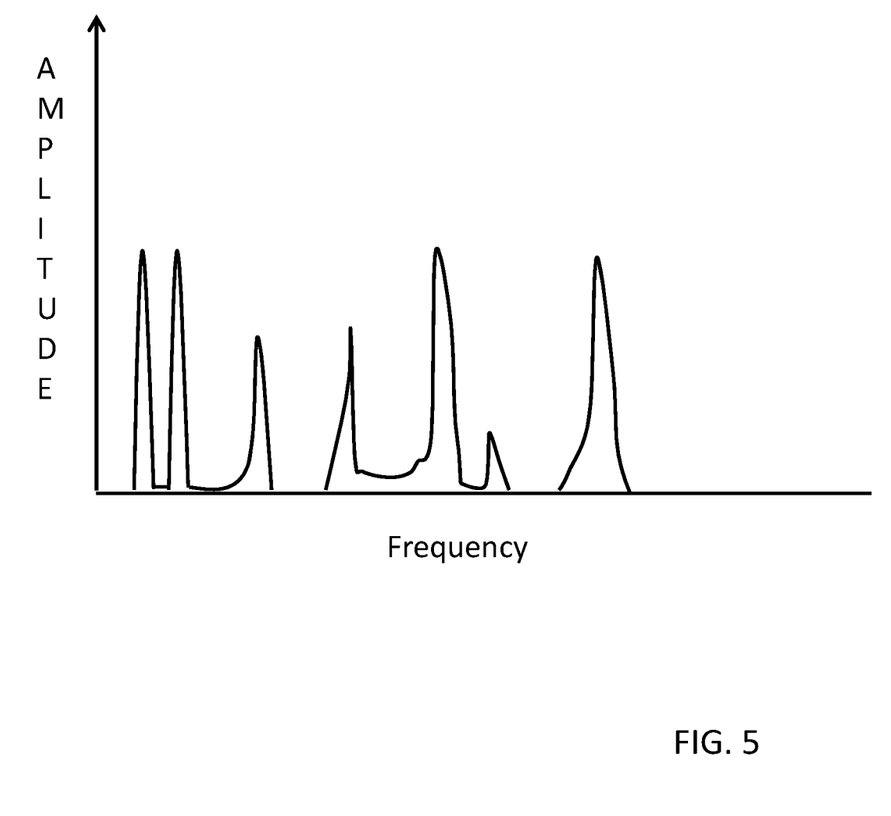
FIG. 5 illustrates a graph representing frequencies were energy is reflected.

FIG. 3 illustrates another exemplary embodiment of a blister pack 100. As with in FIG. 1, the blister pack has cells 110, a foil layer 120, and a clip 130. However, the clip 130 in this embodiment sends a swept acoustic signal. Sweeping the stimulation frequency along the blister pack 100 allows for the determination of the characteristic resonance frequency in the blister pack 100, which are indicated by the nulls or peaks. The nulls or peaks indicate the presence of discontinuity in the blister pack 50 and the location of discontinuity can be determined. FIGS. 4 and 5 are graphs that illustrate the swept acoustic signal and its feedback.

FIG. 4 illustrates the response where additional acoustic energy is absorbed at resonance frequencies. FIG. 5 illustrates where additional acoustic energy is reflected at resonance frequencies.

Additionally, for the blister pack 100 in FIG. 3, the edges of the blister pack 100 can be cropped to create specific resonances that are changed or disrupted by the foil or plastic being broken. This will enhance the effect of swept frequency on the blister pack 100 characteristic resonance and the determination of when there are nulls or peaks indicating discontinuity in the blister pack 100.

Figure 6:
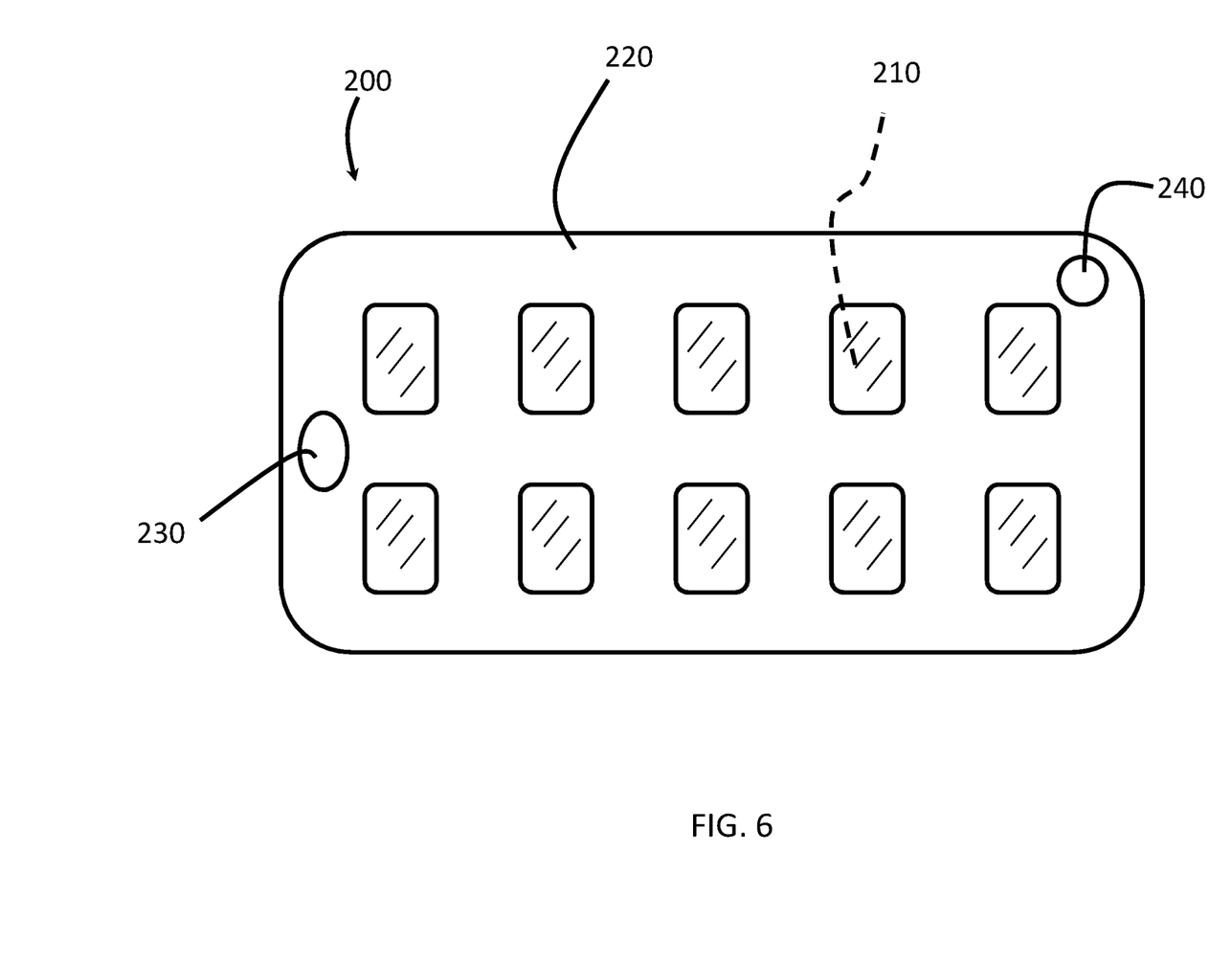
FIG. 6 schematically illustrates an assembly arranged to perform a magnetic injection and detection method for inspecting blister packs.
Figure 7:
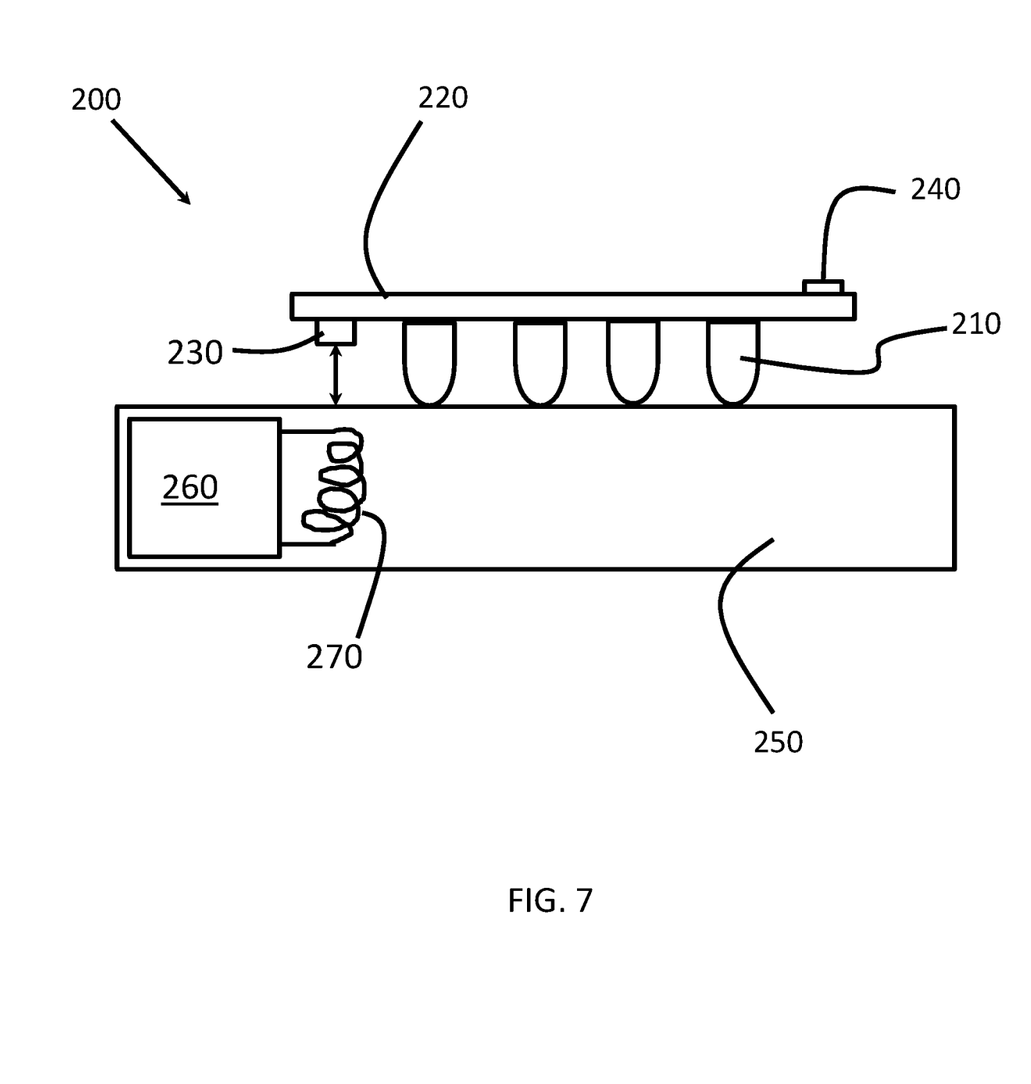
FIG. 7 schematically illustrates an assembly arranged to perform a magnetic injection and detection method for inspecting blister packs.
Figure 8:
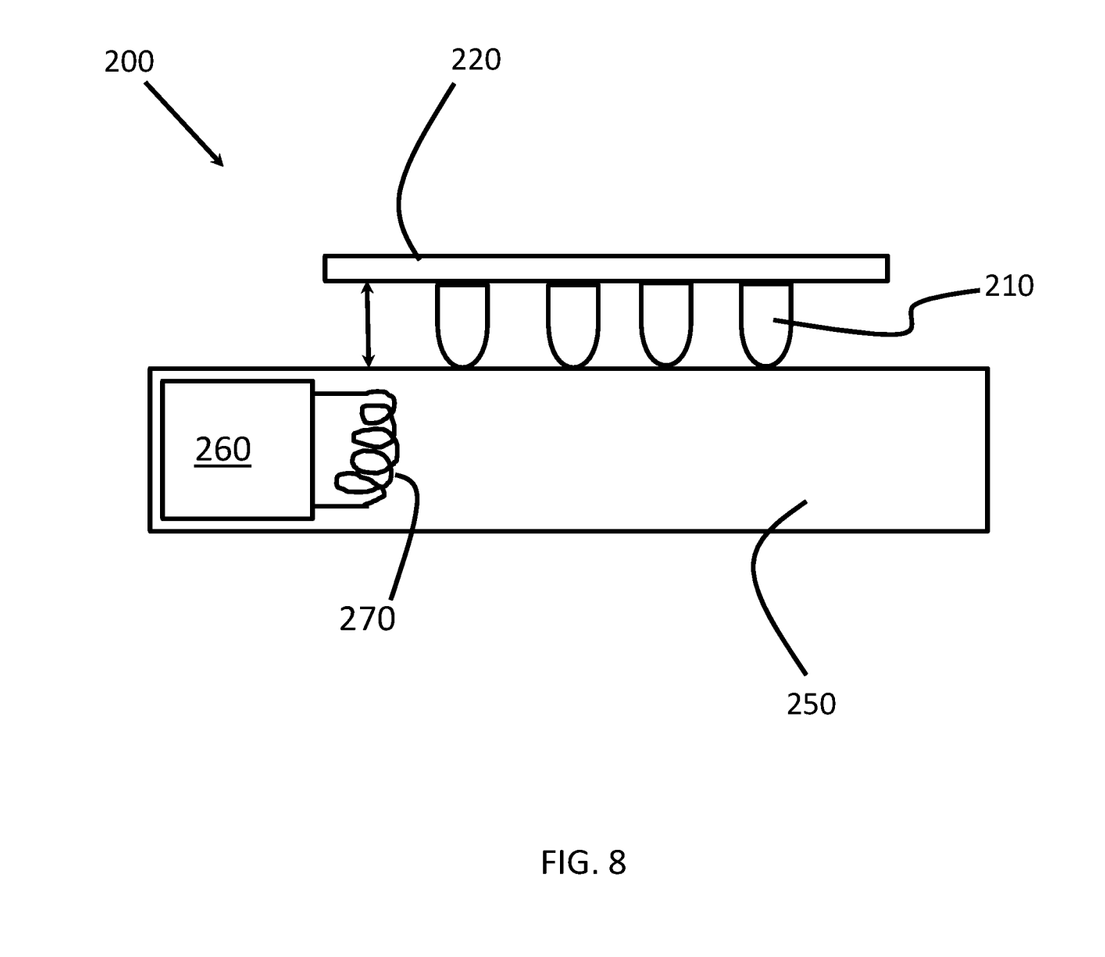
FIG. 8 schematically illustrates an assembly arranged to perform a magnetic injection and detection method for inspecting blister packs.

In previous examples, determination of the presence and location of discontinuities was achieved by coupling a clip in direct contact with the blister pack. In FIGS. 6-8, embodiments of detection systems are illustrates that do not reply on physical contact with the blister pack 200. The blister pack 200 includes a plurality of cells 210 and a foil layer 220 sealing those cells 210. In addition, the blister pack includes a first magnetic material 230 and an optional second magnetic material 240. The magnetic material can be printed on the foil layer 220 or inserted into the blister pack 200 near the foil layer 220. The method is an acousto-magnetic method as will be further discussed.

As illustrated in FIGS. 7 and 8, the blister pack 200 can be placed on top of a housing 250, which includes a magnetic pulse driver and detector 260 with a coil 270. When the blister pack is located on top of the housing 250, the magnetic pulse driver can create a magnetic pulse that creates a magnetic field that engages with the magnetic material 230, 240 on the blister pack 200 through eddy forces and causes the blister pack 200 to move. As with the acoustic methods described above, such movement can be analyzed as a series in the time domain or frequency responses to determine the location and other characteristics of discontinuities.

With regard to the magnetic material 230, 240, the embodiments shown illustrate two magnetic materials. However, the arrangement can have less than two or more than two magnetic materials, while remaining within the scope of this disclosure. The magnetic materials can acts as an injection receiving point.

FIG. 8 illustrates a side view of the blister pack 200. In this embodiment, the blister pack 200 does not include additional magnetic materials. When the magnetic pulse driver 260 applies a magnetic field to the blister pack 200, the foil itself is affected by the magnetic field to cause movement. A discontinuity in the blister pack 200 such as an tear above a cell 210 can causes a change in eddy current and a corresponding change in phase and amplitude that can be detected by measuring the impedance changes in the coil.

The foregoing description of examples has been represented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

I claim:

1. A system for determining discontinuities in a blister pack, comprising:
    a blister pack including:
        a tray with a plurality of cells; and
        a seal layer arranged to seal the cells; and
    a discontinuity sensing apparatus coupled to the blister pack and including:
        a signal generation element that is arranged to transmit a pulse across the seal layer of the blister pack and causes the blister pack to move; and
        a signal receiving element.

2. The system of claim 1, wherein the pulse is an acoustic pulse.

3. The system of claim 1, wherein the discontinuity sensing apparatus is coupled to the blister pack such that each of the plurality of cells is positioned at a unique distance from the discontinuity sensing apparatus.

4. The system of claim 1, wherein determinations on discontinuities is made in part from information from a time domain.

5. The system of claim 1, wherein determinations on discontinuities is made in part from information from a frequency domain.

6. The system of claim 1, wherein the signal generation element is arranged to converted a reflected and received acoustic pulse into an electrical signal.

7. The system of claim 1, wherein the plurality of cells are designed to receive pharmaceuticals.

8. The system of claim 1, wherein the blister pack comprises at least one edge arranged to reflect the pulse back to the discontinuity sensing apparatus.

9. The method of claim 1, wherein the blister pack comprises at least one edge that is cropped to create specific resonances.

10. A method for determining discontinuities in a blister pack, comprising:
    providing a housing, a magnetic pulse driver disposed within the housing, and a detector disposed within the housing;
    placing a blister pack onto the housing;
    directing a magnetic pulse from the magnetic pulse driver to the blister pack to create a magnetic field that engages with the blister pack and causes the blister pack to move; and
    gathering information regarding discontinuities on a seal layer of the blister pack and determinations on discontinuities are made in part from information from a time domain.

11. The method of claim 10, further including a step of providing at least one magnetic material coupled to the blister pack.

12. The method of claim 10, further including a step of determining the location of discontinuities based on the gathered information.

13. The method of claim 10, where a discontinuity in the seal layer of the blister pack causes a change in eddy current.

14. The method of claim 13, wherein the change in eddy current causes a corresponding change in phase and amplitude.

15. The method of claim 10, wherein the detector includes a coil.

16. The method of claim 15, further comprising a step of measuring impedance changes in the coil.

17. The method of claim 11, where the at least one magnetic material is printed on the seal layer or inserted into the blister pack near the seal layer.

* * * * *